US012638576B2

(12) United States Patent
Yamaoka et al.

(10) Patent No.: US 12,638,576 B2
(45) Date of Patent: May 26, 2026

(54) RADAR SIGNAL PROCESSING DEVICE AND RADAR SIGNAL PROCESSING METHOD

(71) Applicant: Mitsubishi Electric Corporation, Tokyo (JP)

(72) Inventors: Tomoya Yamaoka, Tokyo (JP); Kei Suwa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 344 days.

(21) Appl. No.: 18/223,708

(22) Filed: Jul. 19, 2023

(65) Prior Publication Data

US 2023/0358880 A1 Nov. 9, 2023

Related U.S. Application Data

(63) Continuation of application No. PCT/JP2021/013431, filed on Mar. 30, 2021.

(51) Int. Cl.
| | |
|---|---|
| *G01S 13/90* | (2006.01) |
| *G01S 7/282* | (2006.01) |
| *G01S 7/295* | (2006.01) |
| *G01S 13/48* | (2006.01) |

(52) U.S. Cl.
CPC .......... *G01S 13/9011* (2013.01); *G01S 7/282* (2013.01); *G01S 7/295* (2013.01); *G01S 13/48* (2013.01)

(58) Field of Classification Search
None
See application file for complete search history.

(56) References Cited

U.S. PATENT DOCUMENTS

| | | | | |
|---|---|---|---|---|
| 5,627,543 | A | * | 5/1997 | Moreira .............. G01S 13/9011 |
| | | | | 342/25 A |
| 7,373,127 | B2 | | 5/2008 | Reed |

OTHER PUBLICATIONS

Pelletier et al., "Angle-of-Arrival Estimation for a Rotating Digital Beamforming Radar", 2013 IEEE Radar Conference(RadarCon13), Apr. 29, 2013-May 3, 2013, total 6 pages.

* cited by examiner

*Primary Examiner* — Whitney Moore
(74) *Attorney, Agent, or Firm* — Birch, Stewart, Kolasch & Birch, LLP

(57) ABSTRACT

A radar signal processing device includes: a forming unit to form beams by using reception signals; a compensation unit to compensate for a phase within a range frequency; a generation unit to generate an image of each beam by applying Fourier transform in an azimuth direction to the beams (with phases compensated; an identification unit to identify a position of a target object based on the image; a calculation unit to calculate power of each beam represented by the image of each beam at a position of the target object; a computing unit to compute an antenna gain of each beam at a position of the target object; and an angle measurement unit to measure angle on the target object by performing maximum likelihood estimation of comparing the power of each beam with the antenna gain of each beam at the position of the target object.

3 Claims, 12 Drawing Sheets

START

Generate Signal SG(T) — ST11

Up-Convert Signal SG(T) — ST12

Amplify Signal SG(T) — ST13

Switch Antenna 100a — ST14

Transmit Signal SG(T) — ST15

Receive Signal SG(R) — ST16

Amplify Signal SG(R) — ST17

Down-Convert Signal SG(R) — ST18

Filter Signal SG(R) — ST19

A/D-Convert Signal SG(R) — ST20

Store Raw Data NDa etc. — ST21

END

Elevation Direction (dxm, dym)

Azimuth Direction

100a

100b

BM1

BM2

L Beams

RADAR SIGNAL PROCESSING DEVICE AND RADAR SIGNAL PROCESSING METHOD

CROSS REFERENCE TO RELATED APPLICATIONS

This application is a Continuation of PCT International Application No. PCT/JP2021/013431 filed on Mar. 30, 2021, which is hereby expressly incorporated by reference into the present application.

TECHNICAL FIELD

The present disclosure relates to a radar signal processing device and a radar signal processing method.

BACKGROUND ART

The digital beam forming radar described in Non-Patent Literature 1, which is one of radar signal processing devices, monitors a region by simultaneously forming a plurality of beams at different azimuth angles and elevation angles.

CITATION LIST

Non-Patent Literature

Non-Patent Literature 1: M. Pelletier, S. Sivagnanam, and P. Lamontagne, "Angle-of-Arrival Estimation for a Rotating Digital Beamforming Radar" 2013 IEEE Radar Conference

SUMMARY OF INVENTION

Technical Problem

However, clutter with large scattering present within the same range as a target object cannot be discriminated, and as a result, a sufficient azimuth angle angular resolution cannot be obtained.

An object of the present disclosure is to provide a radar signal processing device and a radar signal processing method in which angular resolution of an azimuth angle is improved by digital signal processing.

Solution to Problem

In order to solve the above problem, a radar signal processing device according to the present disclosure includes: processing circuitry: to form a plurality of beams by using a plurality of reception signals; to compensate for a phase within a range frequency for the formed plurality of beams; to generate an image of each of the beams by applying Fourier transform in an azimuth direction to the plurality of beams whose phases have been compensated; to identify a position of a target object on a basis of the generated image; to calculate power of each of the beams represented by the image of each of the beams at a position of the target object; to compute an antenna gain of each of the beams at a position of the target object; and to perform angle measurement on the target object by performing maximum likelihood estimation of comparing the calculated power of each of the beams with the computed antenna gain of each of the beams at the position of the target object.

Advantageous Effects of Invention

According to the radar signal processing device of the present disclosure, the angular resolution of the azimuth angle can be improved.

BRIEF DESCRIPTION OF DRAWINGS

FIG. 15A illustrates a relationship (part 1) between an antenna position and a scene center position according to the embodiment. FIG. 15B illustrates the relationship (part 2) between the antenna position and the scene center position according to the embodiment.

DESCRIPTION OF EMBODIMENTS

Embodiment

Embodiment

An embodiment of a radar signal processing device according to the present disclosure will be described.

Principle of Embodiment

Figure 4:
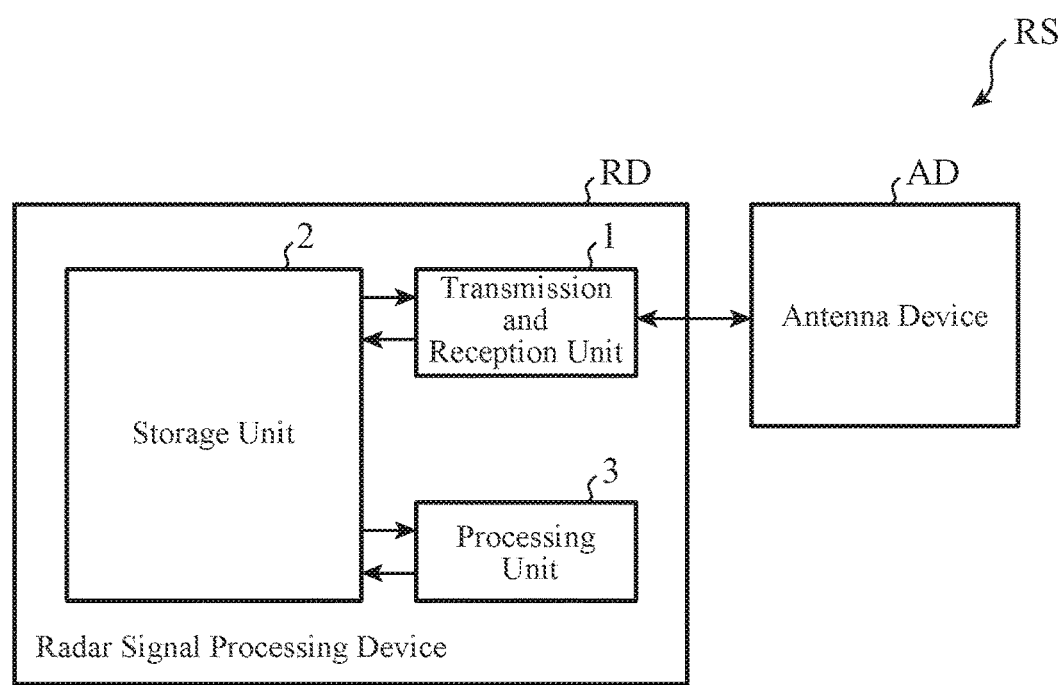
FIG. 4 is a functional block diagram of a radar signal processing device RD according to an embodiment.

Prior to description of the radar signal processing device RD (For example, it is illustrated in FIG. 4.) of the embodiment, a footprint of a reception gain for each reception beam formed by the multibeam digital beam forming (DBF) of the embodiment will be described.

Multibeam DBF, as is conventionally known, is the adjustment of the directivity of an antenna to direct a plurality of beams in a specific direction under digital signal processing.

Figure 5:
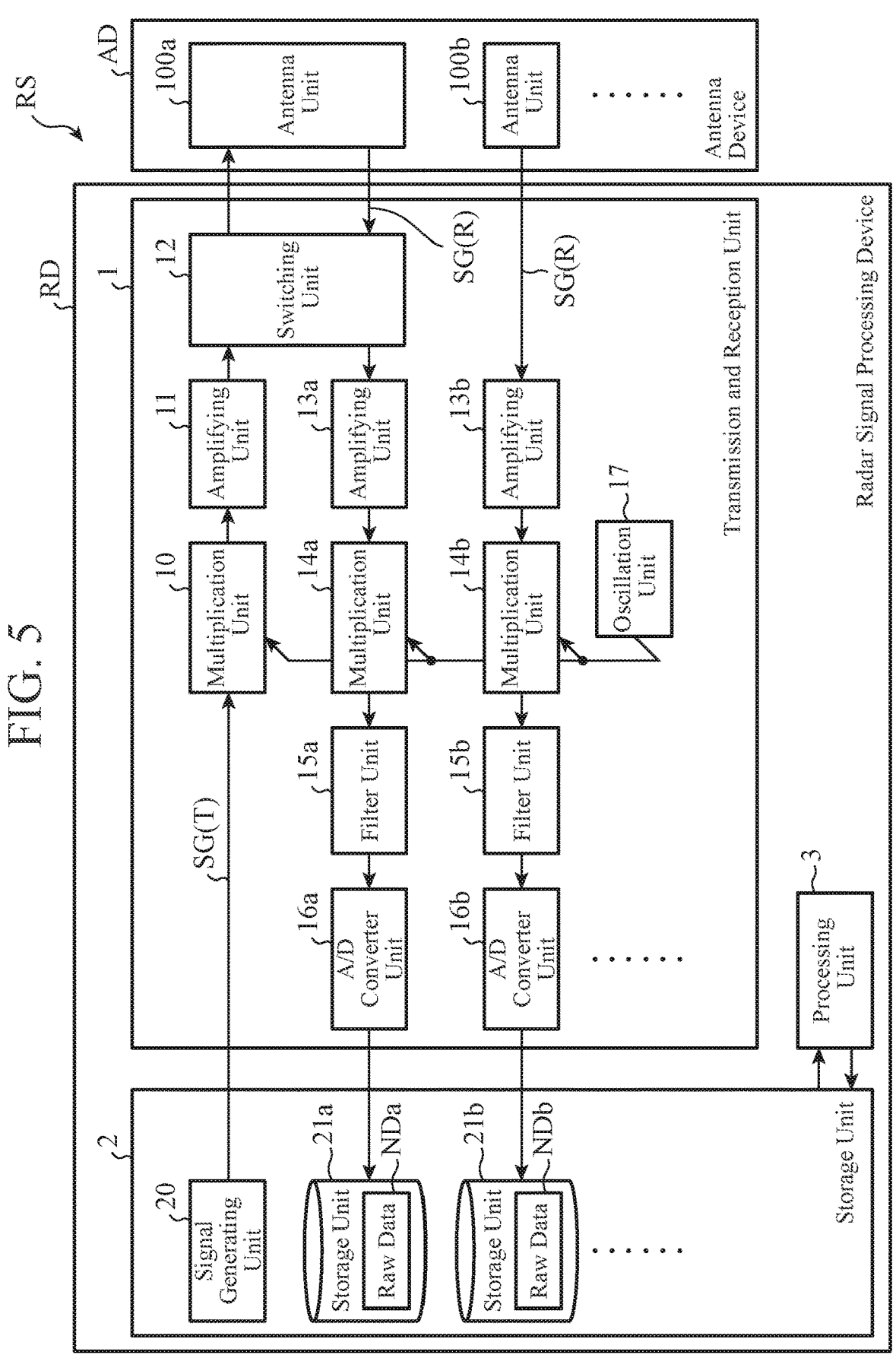
FIG. 5 is a functional block diagram of a transmission and reception unit 1 and a storage unit 2 according to the embodiment.
Figure 14:
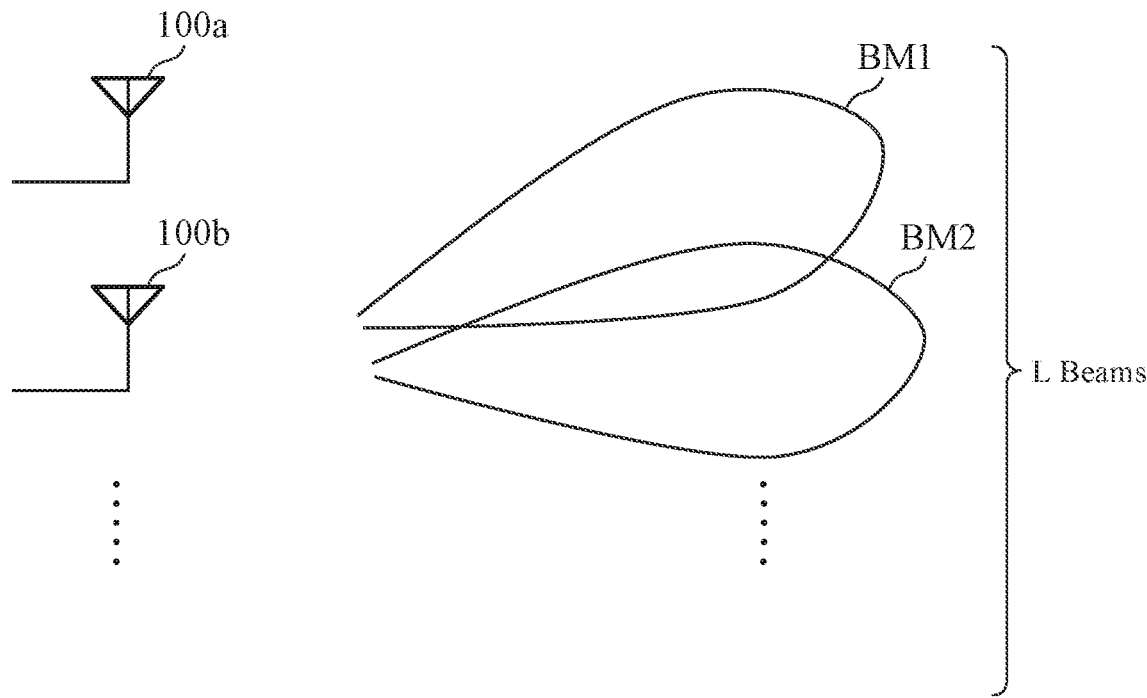
FIG. 14 illustrates formation of a beam according to the embodiment.

The radar signal processing device RD of the embodiment is mounted on, for example, an aircraft together with the antenna device AD (For example, it is illustrated in FIG. 5.). The footprint of the antenna device AD is obtained by the radar signal processing device RD forming the first reception beam BM1, the second reception beam BM2, and the third reception beam BM3 (The first reception beam BM1 and the second reception beam BM2 are illustrated in FIG. 14.) using the signal SG(R) (For example, it is illustrated in FIG. 5.) received by the antenna device AD in the moving aircraft.

The footprint of the antenna device AD represents the gain of each of the first reception beam BM1 to the third reception beam BM3 at each point on a ground surface or an ocean surface near the scene center (the center position of the region to be observed) in the form of a map.

Figure 1:
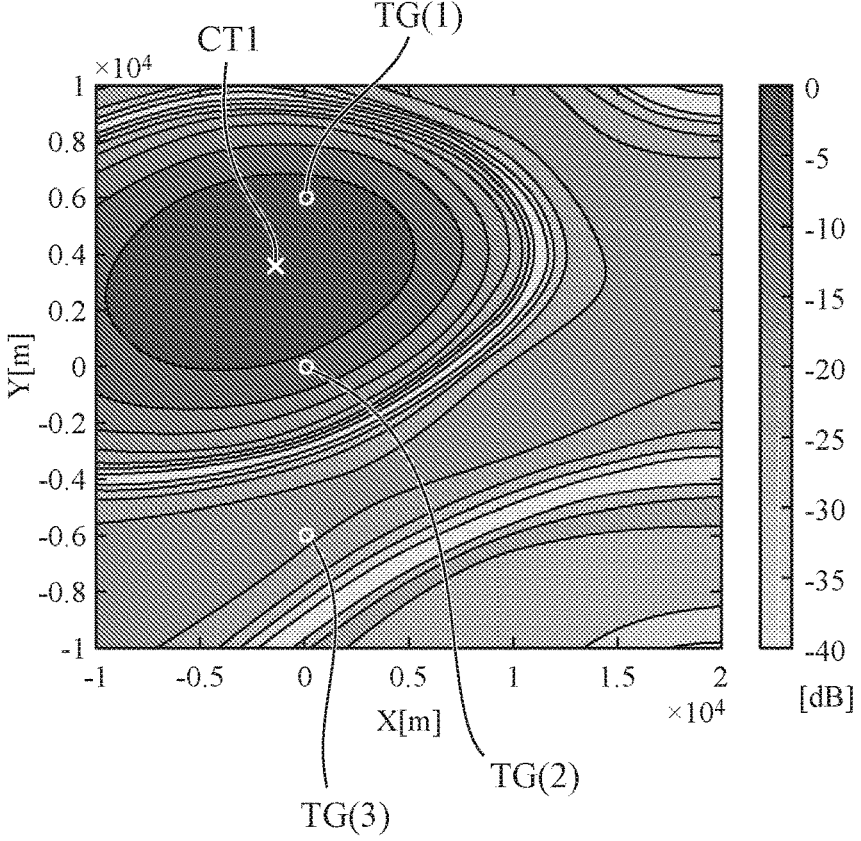
FIG. 1 illustrates a footprint of a reception gain of a first reception beam BM1.

The gain has a dependent characteristic that the gain is different for each of the first reception beam BM1 to the third reception beam BM3 and is different for each position of each point on the XY plane (For example, it is illustrated in FIG. 1.) even in the case of the same reception beam.

In view of the above characteristics, it is possible to estimate the positions of the target objects TG(1), TG(2), and TG(3) (For example, they are illustrated in FIG. 1.), which are vessels on the sea, for example, on the basis of the ratio of the gains of the first reception beam BM1 to the third reception beam BM3.

The radar signal processing device RD first observes gains at the target objects TG(1), TG(2), and TG(3) from brightness of an image of each of the first reception beam BM1 to the third reception beam BM3 obtained by Doppler beam sharpening (DBS).

Next, the radar signal processing device RD calculates the gain of each of the first reception beam BM1 to the third reception beam BM3 for each azimuth angle of the targets TG(1), TG(2), and TG(3).

Finally, the radar signal processing device RD obtains a likelihood between the observed gain and the calculated gain, and performs maximum likelihood determination to obtain azimuth angles of the target objects TG(1), TG(2), and TG(3).

Here, as is conventionally known, the Doppler beam sharpening is a technique that uses the fact that the Doppler shift of the reception wave due to the relative motion between the mobile object and the stationary object is different in the azimuth direction in order to improve the resolution of the image.

As described above, by using the image obtained by DBS, clutter (For example, diffuse reflection on a ground surface or an ocean surface) is localized in the Doppler frequency region, which is a dimension obtained by frequency conversion in the azimuth direction, and thus clutter is discriminated, and as a result, angle measurement can be performed with high accuracy.

In addition, by using DBS, the effect of the synthetic aperture can be obtained, whereby the angle measurement can be performed with high resolution.

FIG. 1 illustrates a footprint of a reception gain of the first reception beam BM1.

Figure 2:
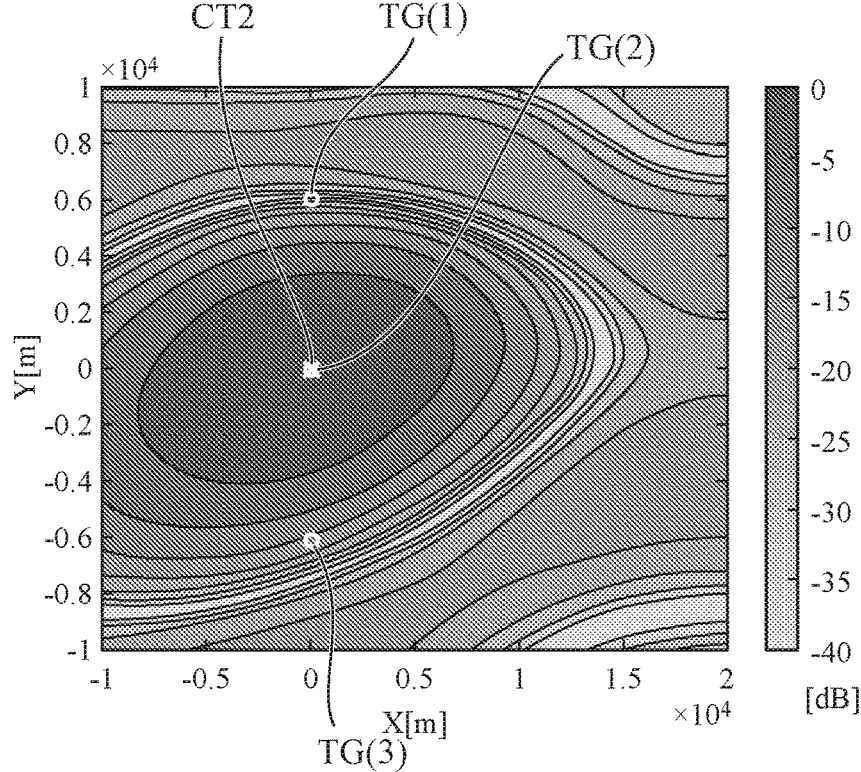
FIG. 2 illustrates a footprint of a reception gain of a second reception beam BM2.

FIG. 2 illustrates a footprint of a reception gain of the second reception beam BM2.

Figure 3:
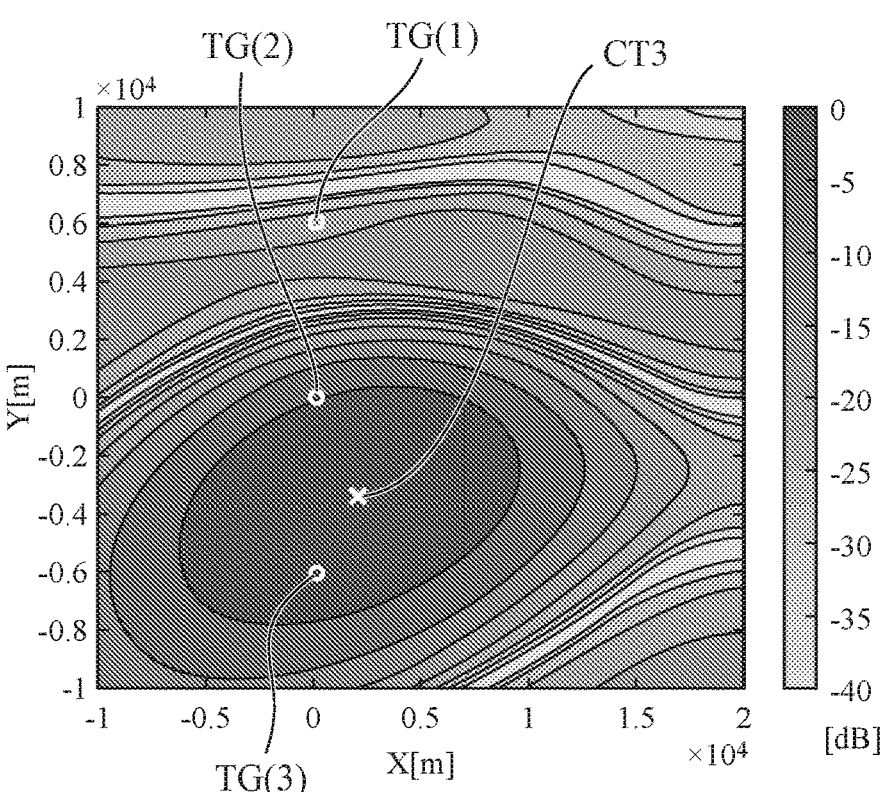
FIG. 3 illustrates a footprint of a reception gain of a third reception beam BM3.

FIG. 3 illustrates a footprint of a reception gain of the third reception beam BM3.

In FIG. 1, a center position CT1 indicated by a cross is a center position of the first reception beam BM1. Similarly, a center position CT2 indicated by a cross in FIG. 2 is a center position of the second reception beam BM2, and a center position CT3 indicated by a cross in FIG. 3 is a center position of the third reception beam BM3. The gain of the first reception beam BM1 at the center position CT1, the gain of the second reception beam BM2 at the center position CT2, and the gain of the third reception beam BM3 at the center position CT3 are normalized.

In FIGS. 1 to 3, the plurality of target objects TG(1), TG(2), and TG(3) to be observed indicated by round marks are, for example, vessels on the sea as described above.

In FIGS. 1 to 3, for example, the relationship between the target object TG(2) and each of the center positions CT1, CT2, and CT3 is as follows.

As illustrated in FIG. 1, the center position CT1 does not coincide with the target object TG(2). Similarly, as illustrated in FIG. 3, the center position CT3 does not coincide with the target object TG(2).

In contrast to the above, as shown in FIG. 2, the center position CT2 coincides with the target object TG(2).

From the above relationship, as illustrated in FIGS. 1 to 3, the gain of the second reception beam BM2 at the target object TG(2) is larger than the gain of the first reception beam BM1 at the target object TG(2) and the gain of the third reception beam BM3 at the target object TG(2).

Function of Embodiment

FIG. 4 is a functional block diagram of the radar signal processing device RD according to the embodiment.

As illustrated in FIG. 4, the radar signal processing device RD of the embodiment is connected to the antenna device AD, and the radar signal processing device RD and the antenna device AD constitute a radar system RS. As illustrated in FIG. 4, the radar signal processing device RD includes a transmission and reception unit 1, a storage unit 2, and a processing unit 3.

<Functions of Transmission and Reception Unit 1 and Storage Unit 2 of Embodiment (Part 1)>

FIG. 5 is a functional block diagram of the transmission and reception unit 1 and the storage unit 2 according to the embodiment.

The functions of the transmission and reception unit 1 and the storage unit 2 will be described with reference to the functional block diagram of FIG. 5. The function of the processing unit 3 will be described later.

As illustrated in FIG. 5, the transmission and reception unit 1 includes a multiplication unit 10, an amplifying unit 11, a switching unit 12, a plurality of amplifying units 13a, 13b, . . . , a plurality of multiplication units 14a, 14b, . . . , a plurality of filter units 15a, 15b, . . . , a plurality of A/D converter units 16a, 16b, . . . , and an oscillation unit 17.

As illustrated in FIG. 5, the storage unit 2 includes a signal generating unit 20 and a plurality of storage units 21a, 21b, . . . . In the plurality of storage units 21a, 21b, . . . , a plurality of pieces of raw data NDa, NDb, . . . are stored.

As will be described later with reference to FIG. 8, the storage unit 2 further includes a plurality of storage units 22(1), 22(2), . . . , 22(L) and a storage unit 23.

As illustrated in FIG. 5, the antenna device AD includes a plurality of antenna units 100a, 100b, . . . . The antenna unit 100a is shared for transmission and reception, and on the other hand, the other antenna units 100b, . . . are dedicated for reception.

Operation of Embodiment (Part 1)

Figure 6:
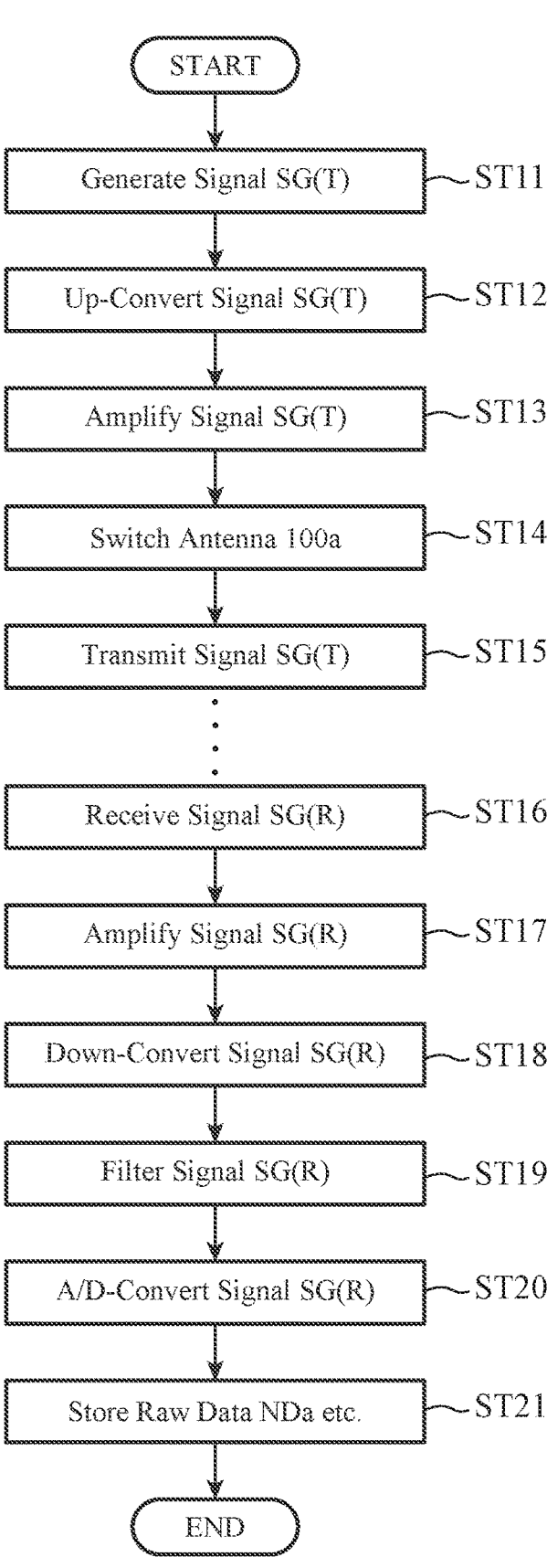
FIG. 6 is a flowchart (part 1) illustrating the operation of the radar signal processing device RD according to the embodiment.

FIG. 6 is a flowchart (part 1) illustrating the operation of the radar signal processing device RD according to the embodiment.

Hereinafter, the operation of the radar signal processing device RD will be described with reference to the flowchart of FIG. 6.

Step ST11: The signal generating unit 20 in the storage unit 2 generates a signal SG(T). The signal generating unit 20 outputs the generated signal SG(T) to the multiplication unit 10 in the transmission and reception unit 1.

The signal SG(T) is, for example, a chirp pulse signal. The signal SG(T) may be a normal pulse signal such as a simple pulse signal instead of the chirp signal.

Step ST12: The multiplication unit 10 multiplies the signal SG(T) by the carrier wave generated by the oscillation unit 17, thereby up-converting the signal SG(T).

Step ST13: The amplifying unit 11 amplifies the up-converted signal SG(T).

Step ST14: The switching unit 12 outputs the amplified signal SG(T) to the antenna unit 100a after switching so as to connect the amplifying unit 11 and the antenna unit 100a that is shared for transmission and reception.

Step ST15: The antenna unit 100a transmits the signal SG(T) over a wide range including the target objects TG(1), TG(2), and TG(3).

The transmitted signal SG(T) is scattered by the target objects TG(1), TG(2), and TG(3).

Step ST16: The antenna units 100a, 100b, . . . receive a signal SG(R) after scattering of the signal SG(T).

Step ST17: The amplifying units 13a, 13b, . . . each amplify the signal SG(R).

Step ST18: The multiplication units 14a, 14b, . . . multiply the amplified signal SG(R) by the carrier wave generated by the oscillation unit 17, thereby down-converting the signal SG(R).

Step ST19: The filter units 15a, 15b, . . . filter the down-converted signal SG(R), that is, pass a component of a specific frequency band in the down-converted signal SG(R).

Step ST20: The A/D converter units 16a, 16b, . . . perform A/D conversion on the signal SG(R) in the analog format that has passed through the filter units 15a, 15b, . . . to convert the signal SG(R) into the signal SG(R) in the digital format. The A/D converter units 16a, 16b, . . . output the signal SG(R) in the digital format to the storage units 21a, 21b, . . . in the storage unit 2.

Step ST21: In the storage unit 2, the storage units 21a, 21b, . . . store the signal SG(R) in the digital format as raw data NDa, NDb, . . . .

<Other Configurations of Transmission Function>

Figure 7:
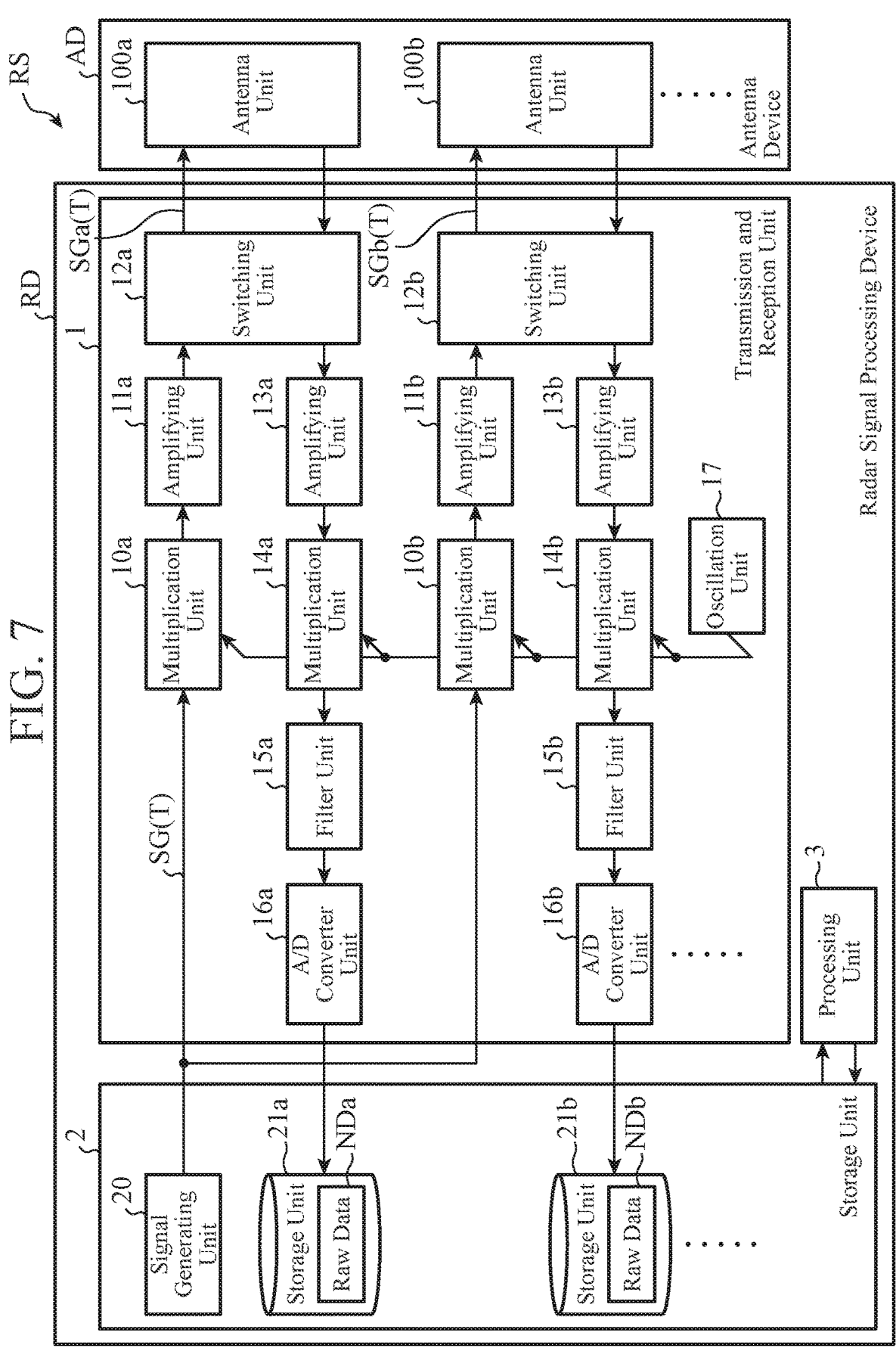
FIG. 7 illustrates another configuration of a transmission function of the radar signal processing device RD according to the embodiment.

FIG. 7 illustrates another configuration of the transmission function of the radar signal processing device RD.

Instead of having a single transmission function (multiplication unit 10, amplifying unit 11, and switching unit 12) for omnidirectional transmission illustrated in FIG. 5, the radar signal processing device RD may have a plurality of transmission functions (a plurality of multiplication units 10a, 10b, . . . , a plurality of amplifying units 11a, 11b, . . . , and switching units 12a, 12b, . . . ) for transmission in a specific direction as illustrated in FIG. 7. By adjusting the phase of each of a plurality of signals SGa(T), SGb(T), . . . , the signal SG(T) obtained by combining the plurality of signals SGa(T), SGb(T), . . . can form, for example, a transmission beam (Not shown.) having the same directivity as the first reception beam BM1 to the third reception beam BM3.

<Function of Unit of Embodiment (Part 2)>

Figure 8:
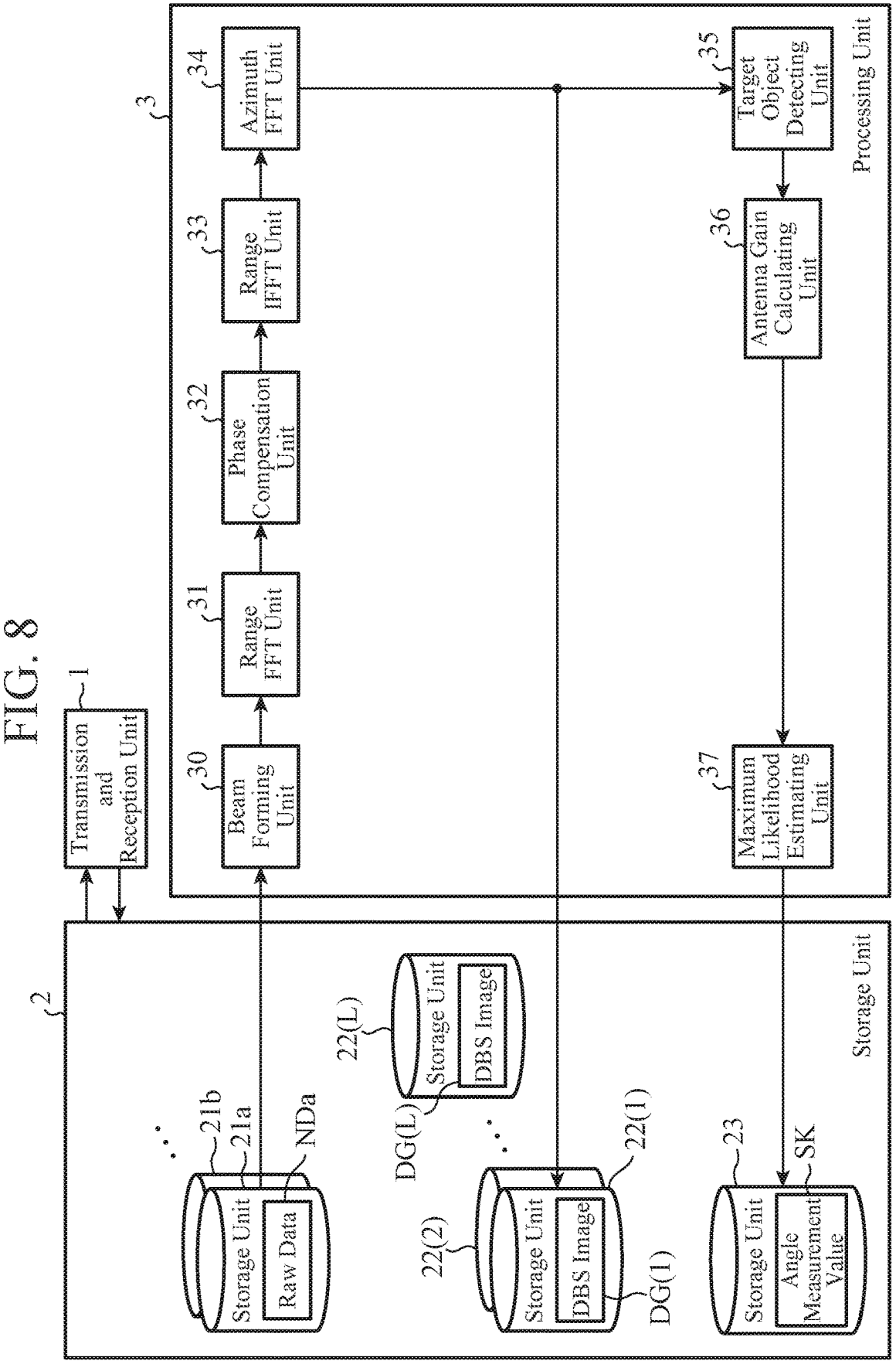
FIG. 8 is a functional block diagram of a processing unit 3 according to the embodiment.

FIG. 8 is a functional block diagram of the processing unit 3 according to the embodiment.

The function of the processing unit 3 will be described with reference to the functional block diagram of FIG. 8.

As illustrated in FIG. 8, the processing unit 3 includes a beam forming unit 30, a range FFT unit 31, a phase compensation unit 32, a range IFFT unit 33, an azimuth FFT unit 34, a target object detecting unit 35, an antenna gain calculating unit 36, and a maximum likelihood estimating unit 37.

<Configurations of Processing Unit 3 and Storage Unit 2 of Embodiment>

Figure 9:
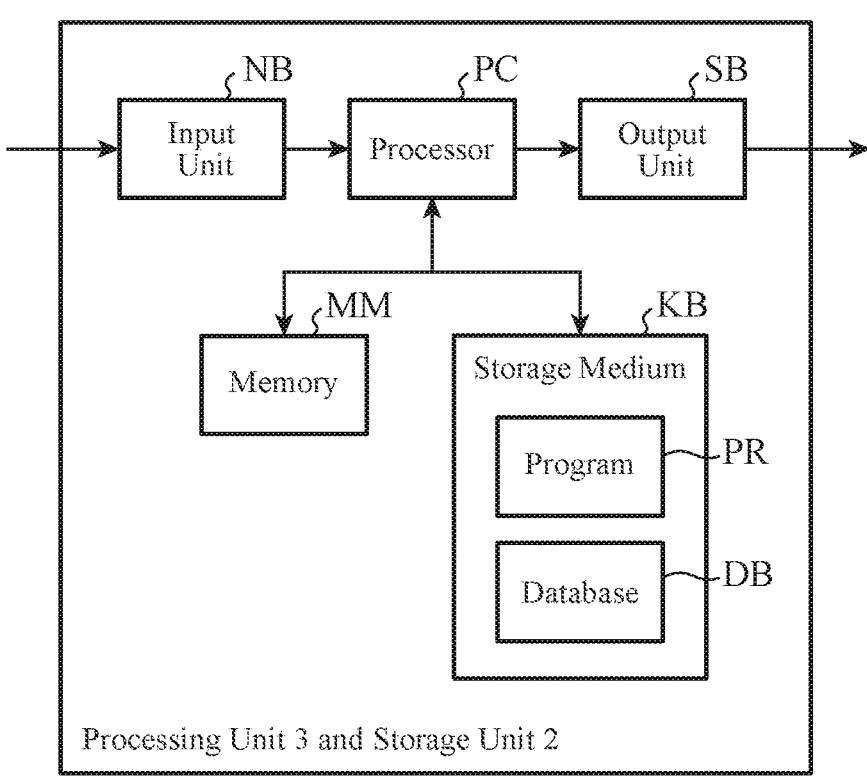
FIG. 9 illustrates configurations of the processing unit 3 and the storage unit 2 according to the embodiment.

FIG. 9 illustrates a configuration of the processing unit 3 and the storage unit 2 according to the embodiment.

As illustrated in FIG. 9, the processing unit 3 and the storage unit 2 of the embodiment include an input unit NB, a processor PC, an output unit SB, a storage medium KB, and a memory MM so as to perform the above-described functions by digital processing.

The input unit NB includes, for example, a keyboard, a mouse, a touch panel, a camera, and a microphone. The processor PC is the core of a well-known computer that operates hardware according to software. The output unit SB includes, for example, a liquid crystal monitor, a printer, and a touch panel. The memory MM includes, for example, a dynamic random access memory (DRAM) and a static random access memory (SRAM). The storage medium KK includes, for example, a hard disk drive (HDD), a solid state drive (SSD), and a read only memory (ROM).

The storage medium KB stores a program PR and a database DB. The program PR is a command group that defines contents of processing to be executed by the processor PC. The database DB is systematic data referred to by the processor PC.

With regard to the relationship between the configurations and the functions in the processing unit 3 and the storage unit 2, on the hardware, while the processor PC executes the program PR stored in the storage medium KB on the memory MM, the processor PC refers to the database DB stored in the storage medium KB as appropriate and controls the operations of the input unit NB and the output unit SB as appropriate, thereby implementing the functions of the respective units of the beam forming unit 30 to the maximum likelihood estimating unit 37.

Operation of Embodiment (Part 2)

Figure 10:
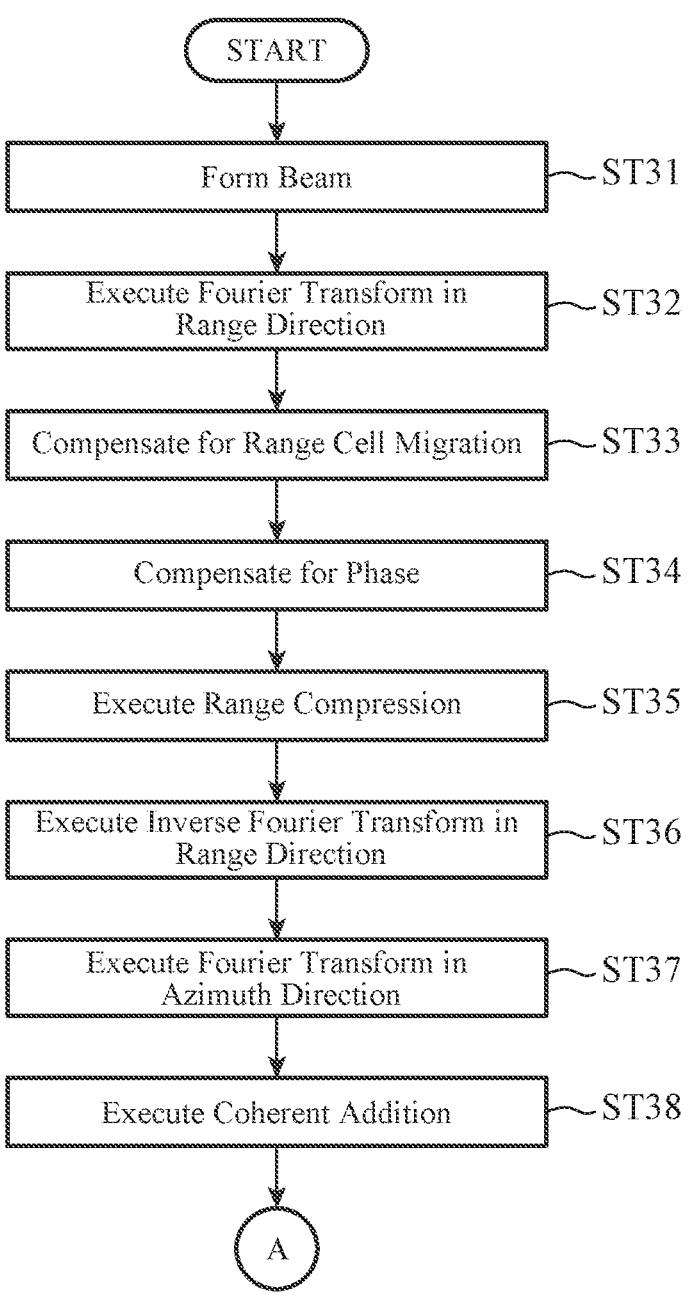
FIG. 10 is a flowchart (the first half of part 2) illustrating the operation of the radar signal processing device RD of the embodiment.

FIG. 10 is a flowchart (the first half of part 2) illustrating the operation of the radar signal processing device RD of the embodiment.

Figure 11:
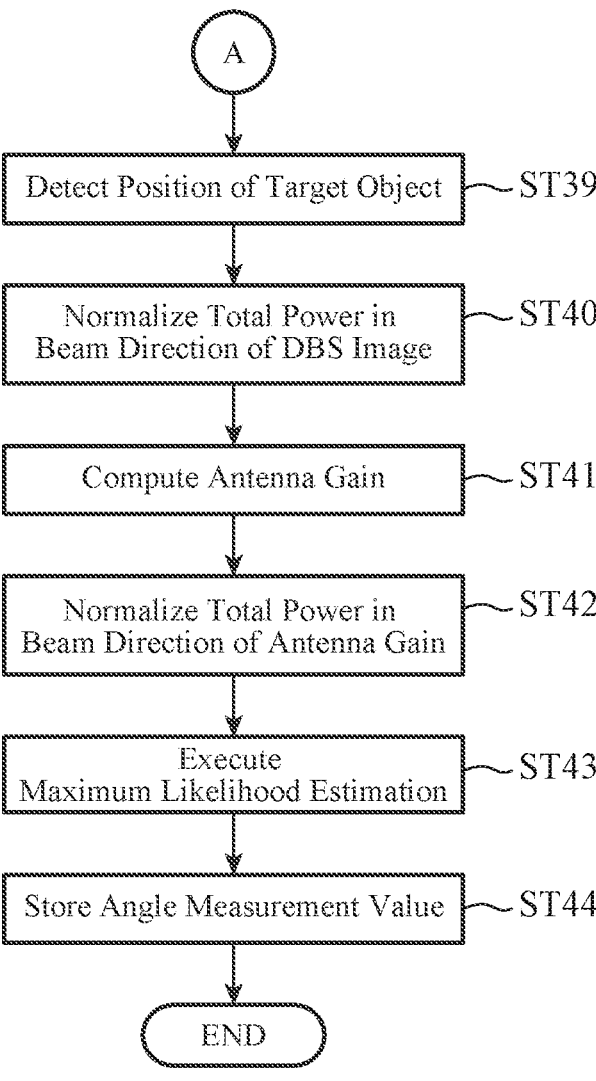
FIG. 11 is a flowchart (the second half of part 2) illustrating the operation of the radar signal processing device RD of the embodiment.

FIG. 11 is a flowchart (the second half of part 2) illustrating the operation of the radar signal processing device RD of the embodiment.

Hereinafter, the operation of the radar signal processing device RD will be described with reference to the flowcharts of FIGS. 10 and 11.

In the following description, a reception signal corresponding to the raw data NDa, NDb, . . . is represented as So(m, n, h) (m represents a receiver number (For example, the serial number of the antenna unit 100), n represents a range cell number, and h represents a pulse number.).

Figure 12:
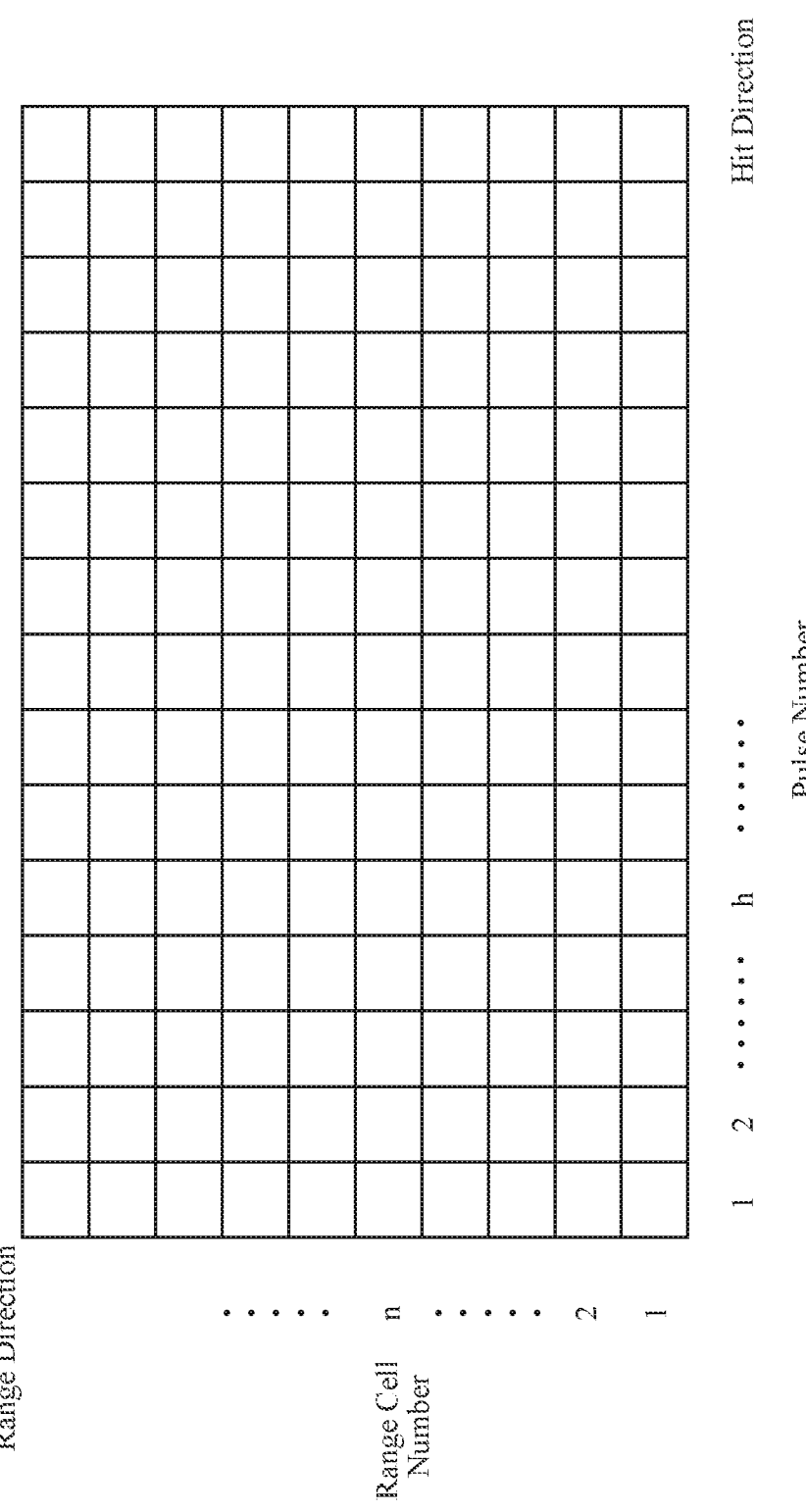
FIG. 12 illustrates a range-hit region according to the embodiment.

FIG. 12 illustrates a range-hit region of the embodiment.

The processing unit 3 performs signal processing in the range-hit region illustrated in FIG. 12. As illustrated in FIG.

12, the variable in the range direction is a range cell number n, and the variable in the hit direction is a pulse number h.

The range cell number is a number assigned to a cell obtained by sampling the distance in the range direction by AD conversion. The pulse number is a number assigned to the transmission signal SG(T) (For example, it is illustrated in FIG. 5.) which is a repeatedly transmitted pulse.

Figure 13:
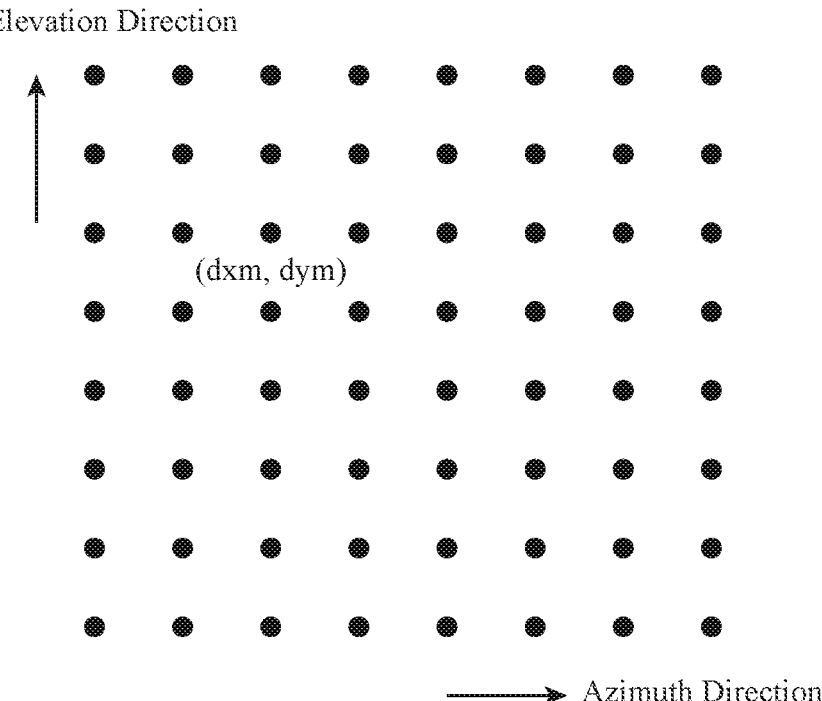
FIG. 13 illustrates an antenna element arrangement of a two-dimensional planar array antenna which is an antenna unit 100 of the embodiment.

FIG. 13 illustrates an antenna element arrangement of a two-dimensional planar array antenna which is the antenna unit 100 of the embodiment.

FIG. 14 illustrates formation of a beam of the embodiment.

FIG. 15 illustrates a relationship between an antenna position and a scene center position of the embodiment;

In the radar system RS of the embodiment, as illustrated in FIG. 14, L reception beams including a first reception beam BM1, a second reception beam BM2, and a third reception beam BM3 (Related to FIGS. 1 to 3.) are formed by the plurality of antenna units 100a, 100b, . . . (For example, it is also illustrated in FIG. 5.).

Step ST31: The beam forming unit 30 forms L reception beams for the reception signal So(m, n, h) according to Formula (1). The L reception beams are formed by using L values of $\varphi_{az}$ and $\varphi_{el}$. The signal $S_{beam}$ after beam formation is expressed by Formula (1).

$$S_{beam}(\varphi_{az}, \varphi_{el}, n, h) = \sum_{m} S_0(m, n, h) =$$
$$\exp\left[j\frac{2\pi}{\lambda}\{d_{xm}\sin(\theta_{az0} + \varphi_{az})\cos(\theta_{el0} + \varphi_{el}) + d_{ym}\sin(\theta_{el0} + \varphi_{el})\}\right] \quad (1)$$

In FIG. 13 and Formula (1), $d_{xm}$ is an azimuth component (a component in the azimuth direction) at an antenna position (Substantially synonymous with the position of the aircraft on which the radar signal processing device RD is mounted) with respect to the m-th antenna unit 100 (For example, it is illustrated in FIG. 5.). $d_{ym}$ is an elevation component (a component in an elevation direction) of the antenna position with respect to the m-th antenna unit 100.

Figures 15A, 15B:
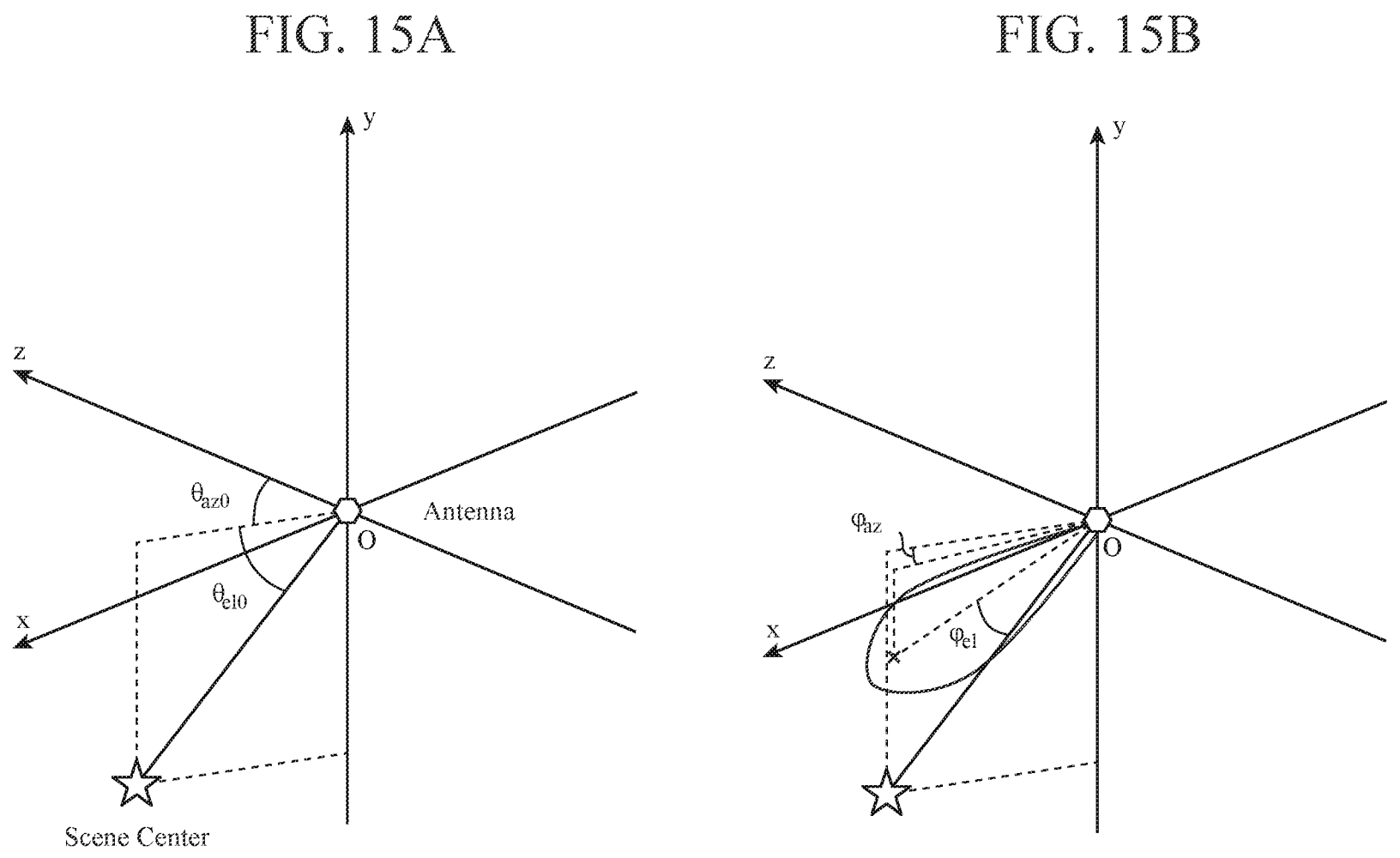

In FIG. 15A and Formula (1), $\theta_{az0}$ and $\theta_{el0}$ are an azimuth angle in the scene center direction and an elevation angle in the scene center direction, respectively.

In FIG. 15B and Formula (1) in which the direction of the formed beam is defined, $\varphi_{az}$ is an azimuth angle of the beam direction with reference to the direction to the scene center. $\varphi_{el}$ is the elevation angle in the beam direction with reference to the direction to the scene center.

In Formula (1), $\lambda$ is a wavelength.

The scene center direction is a direction in which the center position of the region to be observed exists. The beam direction is a direction in which the formed beam is directed, that is, a direction to a beam center which is a center position of the beam. The elevation angle is an angle in the height direction. The azimuth angle is an angle in the horizontal direction.

The forming unit 31 corresponds to a "forming unit".

Step ST32: The range FFT unit 31 applies Fourier transform in a range direction (a dimension direction of a distance) to the signal $S_{beam}$ after beam formation to obtain a range frequency component Sf of the signal $S_{beam}$, and outputs the range frequency component Sf to the phase compensation unit 32.

As the Fourier transform, instead of using Fast Fourier transform (FFT), another frequency transform may be used.

Step ST33: The phase compensation unit 32 derives a distance between each hit and the scene center with respect to the range frequency component Sf of the signal, and compensates for range cell migration of each hit on the basis of the distance r(h).

The range cell migration is a trajectory of a range cell in which the target objects TG(1), TG(2), and TG(3) exist in a range-hit region (Shown in FIG. 12.).

A signal $S_{mig}$ after range cell migration compensation is expressed by Formula (2).

$$S_{mig}(\varphi_{az}, \varphi_{el}, n, h) = S_f(\varphi_{az}, \varphi_{el}, n, h)\exp\left\{j\frac{4\pi f(n)}{c}r(h)\right\} \quad (2)$$

Here, f(n) represents a range frequency of the baseband signal, and c represents a speed of light.

Step ST34: The phase compensation unit 32 performs phase compensation with $f_c$ as a center frequency. A signal $S_{ph}$ after phase compensation is expressed by Formula (3).

$$S_{ph}(\varphi_{az}, \varphi_{el}, n, h) = S_{mig}(\varphi_{az}, \varphi_{el}, n, h)\exp\left\{j\frac{4\pi f(n)}{c}r(h)\right\} \quad (3)$$

The point of phase compensation in Formula (3) is based on the distance to the scene center for all beams, rather than based on the distance to the beam center of each beam. Thereby, the centers in the images for all beams obtained by DBS are unified to the scene center, not the beam center of each beam. As a result, the Doppler frequency ranges of the images obtained by the DBS are all equal, and the signal of the target object appears at the same position in all the images obtained by the DBS. Note that, here, the reference of the phase compensation is set to the scene center, but the scene center may not be set as long as the reference of the phase compensation of each DBS image is the same. For example, the processing may be processing of changing the reference of the phase compensation for each range in order to improve imaging.

The phase compensation unit 32 corresponds to a "compensation unit".

Step ST35: The phase compensation unit 32 performs range compression by multiplying the signal $S_{ph}$ after phase compensation by a reference function G(n) for range compression (compression in the range direction). A signal $S_{comp}$ after range compression is expressed by Formula (4).

$$S_{comp}(\varphi_{az}, \varphi_{el}, n, h) = S_{ph}(\varphi_{az}, \varphi_{el}, n, h)G(n) \quad (4)$$

Step ST36: The range IFFT unit 33 executes inverse Fourier transform in a range direction.

As the inverse Fourier transform, other inverse frequency transform may be used instead of using Inverse Fast Fourier transform (IFFT).

Step ST37: The azimuth FFT unit 34 generates a DBS image $S_{dbs}$ for each beam by performing Fourier transform in the azimuth direction (direction of the dimension of the orbit).

As the Fourier transform, instead of using Fast Fourier transform (FFT), another frequency transform may be used.

The azimuth FFT unit 34 temporarily stores the DBS images DG(1) to DG(L) corresponding to the DBS images $S_{dbs}$ in the storage units 22(1) to 22(L) in the storage unit 2, respectively.

The azimuth FFT unit 34 corresponds to a "generation unit".

Step ST38: The target object detecting unit 35 performs coherent addition (addition performed by aligning phases) on the DBS image $S_{dbs}$ and calculates a sum of all the images to obtain a DBS image $S_{sum}$ after the addition. The DBS image $S_{sum}$ after the addition is expressed by Formula (5).

$$S_{sum}(n,h)=\Sigma_{\varphi_{az},\varphi_{el}}S_{dbs}(\varphi_{az},\varphi_{el},n,h) \tag{5}$$

Instead of using the DBS image $S_{sum}$, the DBS image $S_{dbs}$ on which beam formation is not performed may be used.

Step ST39: The target object detecting unit 35 calculates the maximum power in the DBS image $S_{sum}$ after the addition, detects the positions of the target objects TG(1), TG(2), and TG(3), and specifies the range cell number/the pulse number $n_{max}$, $h_{max}$ to be the position of the maximum power value.

Instead of detecting the position of the target object by the position of the maximum power value, the position of the target object may be detected by a peak power position showing a maximum value.

The target object detecting unit 35 corresponds to an "identification unit" and a "calculation unit".

Step ST40: The target object detecting unit 35 normalizes the total power in the beam direction of the DBS image $S_{dbs}$. A signal $S_{norm}$ after normalization is expressed by Formula (6).

$$S_{norm}(\varphi_{az}, \varphi_{el}, n_{max}, h_{max}) = \frac{|S_{dbs}(\varphi_{az}, \varphi_{el}, n_{max}, h_{max})|}{\sqrt{\sum_{\varphi_{az},\varphi_{el}}|S_{dbs}(\varphi_{az}, \varphi_{el}, n_{max}, h_{max})|^2}} \tag{6}$$

Step ST41: The antenna gain calculating unit 36 calculates an antenna gain g of each beam for each arrival direction of the scattered signal. The antenna gain g is expressed by Formula (7). In Formula (7), $\Psi_{az}$ represents an azimuth angle in the direction of arrival, $\Psi_{el}$ represents an elevation angle, and ( )* represents conjugation.

$$g(\varphi_{az},\varphi_{el},\Psi_{az},\Psi_{el})=\Sigma_{m}w(m,\varphi_{az},\varphi_{el})^*s(m,\Psi_{az},\Psi_{el}) \tag{7}$$

$$w(m,\varphi_{az},\varphi_{el})=\exp(j2\pi(d_{xm}\sin(\theta_{az0}+\varphi_{az})\cos(\theta_{el0}+\varphi_{el})+d_{ym}\sin(\theta_{el0}+\varphi_{el}))/\lambda) \tag{8}$$

$$s(m,\Psi_{az},\Psi_{el})=\exp(j2\pi(d_{xm}\sin(\Psi_{az})\cos(\Psi_{el})+d_{ym}\sin(\Psi_{el}))/\lambda) \tag{9}$$

The antenna gain calculating unit 36 corresponds to a "calculation unit".

Step ST42: The antenna gain calculating unit 36 normalizes the total power of the antenna gain g in the beam direction. An antenna gain $g_{norm}$ after normalization is expressed by Formula (10).

$$g_{norm}(\varphi_{az}, \varphi_{el}, \psi_{az}, \psi_{el}) = \frac{|g(\varphi_{az}, \varphi_{el}, \psi_{az}, \psi_{el})|}{\sqrt{\sum_{\varphi_{az},\varphi_{el}}|g(\varphi_{az}, \varphi_{el}, \psi_{az}, \psi_{el})|^2}} \tag{10}$$

A calculated value of the reception gain of each beam for each azimuth angle of the target objects TG(1), TG(2), and TG(3) is obtained from the result of the simulation by the computer and the measurement value of the antenna pattern obtained using the above Formulas (7) to (10).

Step ST43: The maximum likelihood estimating unit 37 compares the signal $S_{norm}$ after normalization with the antenna gain $g_{norm}$ after normalization to perform maximum likelihood estimation, thereby estimating arrival directions of the target objects TG(1), TG(2), and TG(3).

Specifically, there are a method using a square error and a method using an inner product. In the method using the square error, calculation is performed using Formula (11), and the arrival direction of the target object is determined by the minimum azimuth angle $\Psi_{az}$ and elevation angle $\Psi_{el}$. A signal $S_{error}$ to which the square error method is applied is expressed by Formula (11).

$$S_{error}(\Psi_{az},\Psi_{el})=\Sigma_{\varphi_{az},\varphi_{el}}|S_{norm}(\varphi_{az},\varphi_{el},n_{max},h_{max})-g_{norm}(\varphi_{az},\varphi_{el},\Psi_{az},\Psi_{el})|^2 \tag{11}$$

In the method using the inner product, calculation is performed using Formula (12), and the arrival direction of the target object is determined by the maximum azimuth angle $\Psi_{az}$ and the elevation angle $\Psi_{el}$. A signal $S_{dot}$ to which the inner product method is applied is expressed by Formula (12).

$$S_{dot}(\Psi_{az},\Psi_{el})=\Sigma_{\varphi_{az},\varphi_{el}}|S_{norm}(\varphi_{az},\varphi_{el},n_{max},h_{max})^*g_{norm}(\varphi_{az},\varphi_{el},\Psi_{az},\Psi_{el})| \tag{12}$$

The maximum likelihood estimating unit 37 corresponds to an "angle measurement unit".

Step ST44: The maximum likelihood estimating unit 37 stores an obtained angle measurement value SK, which is the azimuth angle $\Psi_{az}$ and the elevation angle $\Psi_{el}$, in the storage unit 23 in the storage unit 2.

As described above, in the radar signal processing device RD of the embodiment, the angular resolution of the azimuth angle can be improved by the synthetic aperture processing by the Fourier transform in the azimuth direction. In addition, by performing the processing for each pixel in the Doppler frequency region on the image, clutter is localized on the Doppler frequency region. Therefore, clutter can be discriminated on the Doppler frequency region, and angle measurement can be performed with high accuracy.

Components in the embodiment may be appropriately deleted, changed, or another component may be added without departing from the gist of the present disclosure.

According to the radar signal processing device of the present disclosure, the angular resolution of the azimuth angle can be improved.

REFERENCE SIGNS LIST

1: transmission and reception unit, 2: storage unit, 3: processing unit, 10: multiplication unit, 11: amplifying unit, 12: switching unit, 13: amplifying unit, 14: multiplication unit, 15: filter unit, 16: A/D converter unit, 17: oscillation unit, 20: signal generating unit, 21: storage unit, 22: storage unit, 23: storage unit, 30: beam forming unit, 31: range FFT unit, 32: phase compensation unit, 33: range IFFT unit, 34: azimuth FFT unit, 35: target object detecting unit, 36: antenna gain calculating unit, 37: maximum likelihood estimating unit, 100: antenna unit, AD: antenna device, BM1: first reception beam, BM2: second reception beam, BM3: third reception beam, CT1: center position, CT2: center position, CT3: center position, DB: database, DG: DBS image, KB: storage medium, MM: memory, NB: input unit, ND: raw data, PC: processor, PR: program, RD: radar signal processing device, RS: radar system, SB: output unit, SG(R): signal, SG(T): signal, SK: angle measurement value, TG: target object

The invention claimed is:

1. A radar signal processing device comprising:
   processing circuitry:
   to form a plurality of beams by using a plurality of reception signals;

to compensate for a phase within a range frequency for the formed plurality of beams;

to generate an image from each of the beams by applying Fourier transform in an azimuth direction to the plurality of beams whose phases have been compensated;

to identify a position of a target object on a basis of a sum of adding the generated images from the corresponding plurality of beams;

to calculate power of each of the beams represented by the image of each of the beams at the position of the target object;

to compute an antenna gain of each of the beams at the position of the target object;

to normalize the calculated power of each of the beams and to normalize the computed antenna gain of each of the beams; and to perform angle measurement on the target object based on an azimuth angle corresponding to an angle in a horizontal direction and an elevation angle corresponding to an angle in a height direction, by performing maximum likelihood estimation of comparing the normalized calculated power of each of the beams with the normalized computed antenna gain of each of the beams at the position of the target object.

2. The radar signal processing device according to claim 1, the processing circuitry further including to form beams to obtain the plurality of reception signals.

3. A radar signal processing method comprising:

forming a plurality of beams by using a plurality of reception signals;

compensating for a phase within a range frequency for the formed plurality of beams;

generating an image from each of the beams by applying Fourier transform in an azimuth direction to the plurality of beams whose phases have been compensated;

identifying a position of a target object on a basis of a sum of adding the generated images from the corresponding plurality of beams;

calculating power of each of the beams represented by the image of each of the beams at the position of the target object;

computing an antenna gain of each of the beams at the position of the target object;

normalizing the calculated power of each of the beams and normalizing the computed antenna gain of each of the beams; and performing angle measurement on the target object based on an azimuth angle corresponding to an angle in a horizontal direction and an elevation angle corresponding to an angle in a height direction, by performing maximum likelihood estimation of comparing the normalized calculated power of each of the beams with the normalized computed antenna gain of each of the beams at the position of the target object.

* * * * *